Patented Mar. 4, 1952

2,587,579

UNITED STATES PATENT OFFICE 2,587,579

INTERMEDIATE COMPOUNDS IN THE SYNTHESIS OF DEHYDROCORTICOSTERONE

Edward C. Kendall, Rochester, Minn., assignor to Research Corporation, New York, N. Y., a corporation of New York No Drawing. Application January 12, 1951, Serial No. 205,839

2 Claims. (Cl. 260—397.1)

This invention relates to 3(a)-hydroxy-12-halogen-$\Delta^{9,11}$-cholenic acids and their lower alkyl esters which are useful intermediates in the synthesis of dehydrocorticosterone.

This application is a continuation-in-part of my applications Serial No. 653,176, filed March 8, 1946, now Patent No. 2,541,074, Serial No. 733,188, filed March 7, 1947, now abandoned, and Serial No. 51,488, filed September 27, 1948, now abandoned.

The new compounds of the invention may be represented by the general formula

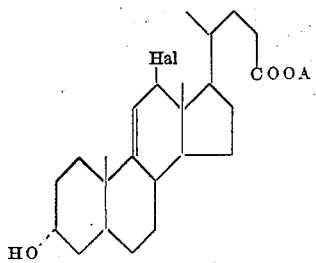

wherein Hal represents chlorine or bromine and A represents hydrogen or a lower alkyl group.

The new compounds of the invention may be made by the following method.

A lower alkyl ester of 3-benzoyldesoxycholic acid is oxidized to the corresponding 3(a)-benzoxy-12-ketocholanate and a double bond is inserted at $C_{9-11}$ by dehydrogenation with selenium dioxide. Hydrolysis yields 3(a)-hydroxy-12-keto-$\Delta^{9,11}$-cholenic acid. The acid is esterified to a lower alkyl ester and the 12 carbonyl group is reduced to give the corresponding ester of 3(a),12-dihydroxy-$\Delta^{9,11}$-cholenic acid. This is converted into the corresponding 12-alkoxy compound and the compounds of the invention are obtained by treating a solution of the alkoxy compound with hydrogen chloride or hydrogen bromide or with concentrated hydrochloric or hydrobromic acids.

The following is a specific example of the production of the compounds of the invention:

*Desoxycholic acid.*—Treatment of crude desoxycholic acid with 8 volumes of benzene boiled under a reflux for 24 hours followed by filtration and repetition for a second 24 hours removed practically all fatty acids. This fraction varied from 3 to 8 per cent and consisted principally of palmitic acid. Digestion under a reflux with hot acetone-water 4:1 for several hours in the proportion of 1 kg. of the bile acid to 6 liters of aqueous acetone dissolved all of the acid. The solution was cooled to 0° and filtered. About two-thirds of the starting material separated, which melted at 176–177°. Recrystallization from methyl ethyl ketone increased the melting point to 177–178°. Concentration of the mother liquor and recrystallization yielded more material with melting point 176–177°.

*Methyl desoxycholate.*—1,200 gm. of purified desoxycholic acid were dissolved in 3.6 liters of methanol and 40 cc. of concentrated hydrochloric acid were added. After 3 hours at room temperature the solution was cooled to 5° and the following day the ester was removed by filtration. After addition of 40 gm. of sodium bicarbonate the methanol was concentrated under reduced pressure and three more crops of crystals were obtained. The total weight was 1,250 gm. The ester separates from solution combined with ½ molecule of methanol of crystallization. The melting point of this ester with methanol of crystallization is not a satisfactory criterion of purity. Although the crystals partially melt at 82–83°, examination in polarized light reveals the presence of crystalline material even when the temperature is raised slowly to 100°.

*Methyl-3-benzoyldesoxycholate.*—1,688 gm. (4 moles) of methyl desoxycholate which contained ½ molecule of methanol were dissolved in 3,400 cc. of benzene which had been purified by treatment with concentrated sulfuric acid and distilled over sodium hydroxide. To remove methanol the benzene was evaporated under reduced pressure and the volume was made to 5,200 cc. with benzene. After addition of 400 cc. of pyridine the solution was cooled to 20–25° and vigorously stirred. 467 cc. of benzoyl chloride were added in 50 cc. portions and the temperature was held between 20–25°. After 2 hours at room temperature the benzene solution was washed with water, with dilute hydrochloric acid and again with water. After concentration of the benzene solution to a small volume the residue was dissolved in 2 liters of methanol with the aid of heat. The product was separated 18 hours after the solution had been cooled to 0°. Concentration of the mother liquor gave successive crops with a total weight of 1,820 gm.

1 gm. of methyl-3-benzoyldesoxycholate was dissolved in 35 cc. of dry ether. When the solution was concentrated 0.880 gm. of the ester separated combined with ½ molecule of ether, M. P. 93–94°.

The ether of crystallization is firmly held at room temperature. When dried at 100° and 0.1 mm., 5.5000 gm. of crystals lost 0.3760 gm. The loss calculated for ½ molecule of ether was 0.3720 gm.

Methyl-3-benzoyldesoxycholate separated from methanol with ½ molecule of methanol of crystallization which was rapidly lost when dried at room temperature. When heated slowly the methanol was gradually lost and the melting point was 110–111°; if heated rapidly the melting point was 83–84° with effervescence.

*Methyl -3(a)- benzoxy -12- ketocholanate.*—1,986 gm. of methyl-3-benzoyldesoxycholate with methanol of crystallization were dissolved in 2,200 cc. of chlorobenzene which was then removed under reduced pressure. 2,200 cc. of chlorobenzene were added and again removed. The residue was dissolved in 7,300 cc. of chlorobenzene and 1,800 cc. of acetic acid. The solution was stirred mechanically and cooled to 20–25°. 366 gm. of chromic acid in 366 cc. of water were added in portions. After 1 hour 220 cc. of concentrated sulfuric acid were added and the solution was vigorously stirred for 1 hour at 20–25°. The organic phase was washed with 18 liters of water which contained 200 cc. of concentrated hydrochloric acid since this was found to prevent formation of a persistent emulsion. After 4 washings with water the chlorobenzene solution was dried with sodium sulfate, filtered through infusorial earth and concentrated to a small volume. The flask was warmed and 6 liters of methanol were added. The solution was cooled to 5° and allowed to stand for several hours. Three crops were separated: 1,679 gm., M. P. 128.5–129°; 162 gm., M. P. 127–127.5°; 9 gm., M. P. 123–124°.

*3(a) - hydroxy - 12 - keto-$\Delta^{9,11}$-cholenic acid.*—508 gm. of methyl 3(a) - benzoxy - 12 - ketocholanate were dissolved in 3,560 cc. of chlorobenzene-acetic acid 4:1. 130 gm. of selenium dioxide and 2 cc. of 1.22 N hydrogen chloride in acetic acid were added and the solution was refluxed for 72 hours. Three solutions prepared as described were combined, the selenium was removed by filtration, 150 gm. of chromic acid in 150 cc. of water were added to the filtrate and the solution was stirred vigorously for 2 hours. The chlorobenzene solution was decanted and again stirred for 2 hours with 75 gm. of chromic acid in 75 cc. of water. The organic phase was separated and washed 4 times with 8 liters of water. The chlorobenzene was removed under reduced pressure and the residue was dissolved in 4 liters of methanol which contained 400 cc. of 18 N sodium hydroxide. The ester was hydrolyzed for 2 hours without the aid of heat, and water was added to dissolve the sodium salt which had separated. The solution was freed of methanol and last traces of chlorobenzene under reduced pressure. The aqueous solution of the sodium salt was divided into two equal parts.

4.5 liters of water were heated to 100° in a 12 liter flask with a rapid stream of steam. 250 cc. of acetic acid and a few crystals of 3(a)-hydroxy-12-keto-$\Delta^{9,11}$-cholenic acid were added and while the solution was vigorously agitated with steam one-half of the aqueous solution of the sodium salt was slowly added. The acid separated as a voluminous mass of needles and the suspension was maintained at 100° for 30 minutes. The second half was treated in the same manner. The flasks were cooled and the precipitate was filtered, washed and dried to constant weight (1,094 gm.). The acid was then dissolved in acetone-water 4:1. This step required refluxing for one to two hours with a volume of aqueous acetone equal to twice the weight of the crude acid. After cooling 906 gm. of acid were separated by filtration. A second crop of 149 gm. and a third crop of 27 gm. separated when the solution was concentrated.

63 gm. of 3(a)-hydroxy-12-keto-$\Delta^{9,11}$-cholenic acid, M. P. 178–179°, were dissolved in 500 cc. of hot normal sodium hydroxide and 50 cc. of methanol. The sodium salt was allowed to separate slowly at room temperature and the solution was held at 0° for 18 hours. Filtration removed a small amount of color and yielded the sodium salt, which was well washed with N sodium hydroxide at 5° and then dissolved in 500 cc. of water and precipitated by addition to a hot dilute solution of acetic acid as described. Crystallization from acetone-water 4:1 gave a product which melted at 180–180.5°. Log E=4.070 at λ=240 mμ. $(a)_D = 107° \pm 2°$ (c=1 in methanol).

*Methyl - 3(a) - hydroxy - 12 - keto - $\Delta^{9,11}$-cholenate.*—A. 7.76 gm. of 3(a)-hydroxy-12-keto-$\Delta^{9,11}$-cholenic acid, M. P. 180–180.5°, were esterified in 20 cc. of methanol and 0.2 cc. of concentrated aqueous hydrochloric acid. 10 cc of water containing 200 mg. of sodium bicarbonate were added, the solution was cooled to 5° and 7.36 gm. of crystals melting at 117–119° were separated. The ester was recrystallized from a mixture of 22 cc. of ether, 3 cc. of methanol and 22 cc. of petroleum ether. The melting point was 119.5–120°. Log E=4.077 at λ=240 mμ. $(a)_D = 107° \pm 2°$ (c=1 in methanol).

B. 866 gm. of 3(a)-hydroxy-12-keto-$\Delta^{9,11}$-cholenic acid, M. P. 179.5–180.5° were esterified in methanol as described for the esterification of desoxylcholic acid. Crop 1 weighed 804 gm. and melted at 119.5–120°. Three more crops were obtained: 64 gm., M. P. 115.5–116.5°; 15 gm., M. P. 113.5–114.5°; 4 gm., M. P. 112.0–113.0°.

*Methyl - 3(a),12 - dihydroxy - $\Delta^{9,11}$ - cholenate.*—402 gm. of methyl-3(a)-hydroxy-12-keto-$\Delta^{9,11}$-cholenate were dissolved in a mixture of 600 cc. of acetic acid and 600 cc. of 95 per cent ethanol and shaken in an atmosphere of hydrogen in the presence of 2 gm. of Adams' platinum oxide catalyst until the absorption of hydrogen had ceased. Ninety-four hours were required and 1.00 mole of hydrogen was utilized.

A second 402 gm. portion was reduced under the same conditions except that a freshly prepared sample of platinum catalyst was used. In 63 hours 1.01 moles of hydrogen were absorbed.

The two solutions were combined, filtered from platinum and evaporated under reduced pressure until a thick syrup remained. The syrup was dissolved in benzene and acetic acid was removed with water. The solution was concentrated and the benzene was displaced with methanol.

*Methyl - 3(a) - hydroxy - 12 - methoxy - $\Delta^{9,11}$-cholenate.*—The syrupy residue described in the preceding paragraph was made to 3 liters with methanol and cooled to 5°. The methanolic solution the following mixture was added: 390 cc. of water, 334 cc. of concentrated (37 per cent) hydrochloric acid and sufficient methanol to make 1,800 cc. After 40 days the crystals which had separated were filtered from solution, and washed with 600 cc. of normal hydrochloric acid in 85 per cent methanol and with 8 liters of water. The weight was 757 gm. (90.4 per cent) and the melting point was 160.5–162°. After crystallization from benzene the melting point was 162.5–163°.

It is somewhat more convenient to perform the catalytic reduction in methanol and hydrochloric acid (0.05 N). 402 gm. of methyl-3(a)-hydroxy-12-keto-$\Delta^{9,11}$-cholenate in 1,200 cc. of methanol were reduced with hydrogen in the presence of 2.00 gm. of Adams' platinum oxide. 0.981 mole of hydrogen was absorbed in 12 hours. Without removal of the platinum the solution was made 84 per cent methanol, 16 per cent water and 1 N hydrochloric acid. After 10 days 340 gm. of the crude 12-methoxy compound were separated. After a total of 34 days 51 gm. more were obtained.

The two portions of crystals were combined and recrystallized from 1,200 cc. of benzene. The benzene in the mother liquor was replaced with methanol and the solution was concentrated to small volume. The total weight of the 12-methoxy compound with a melting point of 162–163° was 372 gm.

*Methyl - 3(a) - hydroxy - 12 - chloro - $\Delta^{9,11}$-cholenate.*—83.6 gm. (0.2 mole) of methyl-3(a)-hydroxy - 12 - methoxy - $\Delta^{9,11}$ - cholenate was dissolved in 400 cc. of alcohol-free chloroform in a round bottom flask. The solution was cooled to 5° in an ice bath and vigorously stirred with 200 cc. of concentrated aqueous hydrochloric acid. The chloroform solution was separated and stirred twice more with 200 cc. of concentrated hydrochloric acid. The stirring was continued each time for 30 minutes. The chloro compound can be separated in crystalline form from the chloroform; however, for the purposes of the preparation, the subsequent step may be carried out immediately on the chloroform solution. The methyl - 3(a) - hydroxy - 12 - chloro - $\Delta^{9,11}$-cholenate product melts at 119–124° C.

$(a)_D = 149° \pm 2°$ (29.2 mg. in 3.00 cc. of chloroform).

*Methyl 3(a) - hydroxy - 12 - bromo - $\Delta^{9,11}$-cholenate.*—A solution of 12.56 gm. of methyl 3(a)-hydroxy-12-methoxy-$\Delta^{9,11}$-cholenate in 75 cc. of chloroform was chilled in an ice bath and a stream of dry hydrogen bromide was passed through the solution for 20 minutes. 100 cc. of ligroin were added. The solution was concentrated until it became turbid and was allowed to stand a few minutes. The first crop of crystals (M. P. 136.5–138°) weighed 5.35 gm. By further concentration of the solution successive crops of crystals were obtained: 0.94 gm., M. P. 135–137°; 2.98 gm., M. P. 131–133°; 1.52 gm., M. P. 137–137.5°; 2.94 gm., M. P. 135–136°. Treatment of the product with methanolic alkali yielded more than the theoretical amount of bromide ion and further investigation disclosed the fact that the first crop of crystals contained hydrogen bromide in the proportion of 2 moles of methyl 3(a)-hydroxy-12-bromo-$\Delta^{9,11}$-cholenate with 1 mole of halogen acid. $(a)_D = +209° \pm 2°$ (31.4 mg. of the first crop in 3.00 cc. of chloroform). Later crops of methyl 3(a)-hydroxy-12-bromo-$\Delta^{9,11}$-cholenate were separated without hydrogen bromide of crystallization. In one experiment the crystals melted at 137–138°; however, recrystallization invariably yielded material which melted at a lower point and over a wider range.

$(a)_D = +209° \pm 2°$ (29.9 mg. in 3 cc. of chloroform).

Although in the foregoing examples the methyl 3,12-dihydroxy-$\Delta^{9,11}$-cholenate is converted to the corresponding 12-methoxy compound prior to conversion to the 12-chloro and 12-bromo compounds, because the physical properties of the 12-methoxy compound permit isolation of this compound in high yield and excellent quality, the 12-hydroxy compound may be converted directly into the 12-chloro and 12-bromo compounds by the methods described above without intermediate formation of the 12-methoxy compound.

I claim:

1. A compound of the general formula

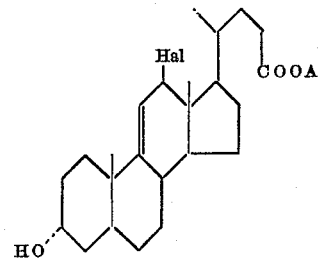

wherein Hal is a halogen of the group consisting of chlorine and bromine and A is selected from the group consisting of hydrogen and lower alkyl groups.

2. Methyl 3(a) - hydroxy-12-chloro-$\Delta^{9,11}$-cholenate.

EDWARD C. KENDALL.

No references cited.